United States Patent [19]

Kanke et al.

[11] Patent Number: 5,681,989

[45] Date of Patent: Oct. 28, 1997

[54] INTAKE AIR AMOUNT MEASURING APPARATUS FOR INTERNAL COMBUSTION ENGINES

[75] Inventors: Atsushi Kanke, Hitachi; Hisao Sonobe; Shigeru Oho, both of Hitachinaka; Kaoru Uchiyama, Oomiya-machi, all of Japan

[73] Assignee: Hitachi, Ltd., Japan

[21] Appl. No.: 560,981

[22] Filed: Nov. 20, 1995

[30] Foreign Application Priority Data

Nov. 18, 1994 [JP] Japan ............................. 6-284778
Jun. 26, 1995 [JP] Japan ............................. 7-159404

[51] Int. Cl.[6] ..................................................... G01F 1/68
[52] U.S. Cl. ........................................................ 73/118.2
[58] Field of Search ............................ 73/202.5, 204.11, 73/204.16, 204.18, 118.2; 364/431.051

[56] References Cited

U.S. PATENT DOCUMENTS

| 4,311,042 | 1/1982 | Hosoya et al. | 73/204.18 |
|---|---|---|---|
| 4,404,846 | 9/1983 | Yamauchi et al. | 73/204.18 |
| 4,449,397 | 5/1984 | Lauterbach | 73/118.2 |
| 4,463,601 | 8/1984 | Rask | 73/202.5 |
| 4,523,462 | 6/1985 | Kolodjski | 73/204.18 |
| 4,719,890 | 1/1988 | Wataya et al. | 73/118.2 |
| 4,934,189 | 6/1990 | Tanimoto et al. | 73/118.2 |
| 4,938,061 | 7/1990 | Carp | 73/118.2 |

FOREIGN PATENT DOCUMENTS

| 62-812 | 1/1987 | Japan . | |
|---|---|---|---|
| 62-73124 | 4/1987 | Japan . | |
| 5223610 | 8/1993 | Japan | 73/202.5 |
| 6010752 | 1/1994 | Japan | 73/202.5 |

OTHER PUBLICATIONS

"Hot Wire Air Mass Meter—A New Air Flow Meter for Gasoline Fuel Injection System," R. Sauer, SAE 800468, 1980.
"Hot Wire Air Flow Meter for Engine Control System," S. Ueno et al., SAE 830615, 1983.

Primary Examiner—George M. Dombroske
Attorney, Agent, or Firm—Evenson, McKeown, Edwards & Lenahan P.L.L.C.

[57] ABSTRACT

The invention provides an apparatus for measuring intake air for an internal combustion engine by means of a detecting unit including a heat generating resistor, and a flow amount arithmetic unit for calculating an air flow amount on the basis of the output from the detecting unit. The measuring apparatus further includes an equalizer circuit for regulating the amplitude or phase of the output signal from the detecting unit, between the detecting unit and the flow amount arithmetic unit.

11 Claims, 15 Drawing Sheets

5,681,989

INTAKE AIR AMOUNT MEASURING APPARATUS FOR INTERNAL COMBUSTION ENGINES

BACKGROUND AND SUMMARY OF THE INVENTION

The present invention relates to an apparatus for measuring intake air for an internal combustion engine, and more particularly to a measuring apparatus which is suitable to detect a counter flow.

Hot wire type air flow meters have been used to measure intake air in an electronic fuel injection system for internal combustion engines such as an automobile, because such meters can detect the amount of mass air flow. The air flow meter described in SAE paper 800468, 830615 has been developed for commercial use. When an engine with fewer than four cylinders operates at low engine speed and under heavy load, a pulsating flow occurs, in which the amplitude of the pulsations of the intake air amount is large and the counter flow appears at a part of the intake air. In such a case, it is difficult to detect the amount of intake air flow with high precision by using the conventional hot wire air flow meter as mentioned above. To improve the precision of the detection, various air flow meters are proposed, for example, in Japanese Patent Application Laid-Open No. 62-812 or Japanese Patent Application Laid-Open No. 62-73124.

An arrangement to correct the counter air flow amount without detecting the direction of the air flow is disclosed in Japanese Patent Application Laid-Open No. 59-148821 or Japanese Patent Publication No. 1-34288, while an arrangement to correct the counter air flow amount by arithmetic processing is disclosed in Japanese Utility Model Laid-Open No. 61-14792 or Japanese Patent Publication No. 4-26048.

If the blow-back phenomenon is measured by the conventional hot wire type air flow meter in which the air returns from an exhaust valve side to an air intake valve as a piston goes up, the air flow meter outputs a positive signal corresponding to the absolute value of the instantaneous flow rate, but does not take into account the flow direction of a forward flow or a counter flow. Since an output signal during the counter flow is therefore the same as during the forward flow, the air flow meter outputs a signal with a value larger than that of the actual average (net) air flow amount. The resulting measurement error may be 30% to 100%.

If a special hot wire probe is used, which is able to rapidly detect independently the forward flow and the counter flow, it is possible to minimize the error of the average air flow amount by detecting the direction from the difference in the air flow amount between the forward flow and the counter flow, and outputting the air flow amount in accordance with the detecting direction. However, the manufacturing cost of such a detection is increased and its reliability is deteriorated, because it is required to use the special hot wire probe as mentioned above.

SUMMARY OF THE INVENTION

An object of the present invention is to provide an apparatus for measuring intake air amount for internal combustion engines which can detect a reverse flow with high accuracy.

The above object is attained by modulating the amplitude of an output signal from a counter flow detector unit, between the detector unit itself and an air flow amount arithmetic unit.

According to one embodiment of the present invention, the intake air flow measuring apparatus for internal combustion engines comprises a detector unit including a heating resistor, and an arithmetic unit for calculating an air flow amount on the basis of the output from the detector unit. In addition, there is provided means for adjusting the amplitude of the output signal from the detector unit, between the detector unit and the arithmetic unit.

In another embodiment of the present invention, the intake air measurement apparatus for internal combustion engines comprises two detector units including a bridge circuit with a heating resistor, and an arithmetic unit for calculating an air flow amount on the basis of an output from the detector unit. Further, first and second means for modulating the amplitude of an output signal from said detector unit are provided between the respective detector units and the arithmetic unit.

By means of the above construction, it is possible to obtain a corrected hot wire signal which is close to the actual air flow amount, and to minimize the error of the average air flow amount, by electrically correcting or compensating the response delay of the hot wire signals, and switching the output between the two hot wire signals with the response delays corrected, on the basis of the detected direction signal. Further, the reverse flow through a passage can be detected, and prior to correcting the air flow amount with respect to the reverse flow, a counter flow map is corrected, which is a counter flow side air flow amount conversion function for converting an output signal from the heating resistor into the air flow amount. It is, therefore, possible to improve the accuracy of measurement by correcting the air flow amount in a two-step process, by using the correction counter-flow map.

DESCRIPTION OF THE PREFERRED EMBODIMENTS

Figure 1:
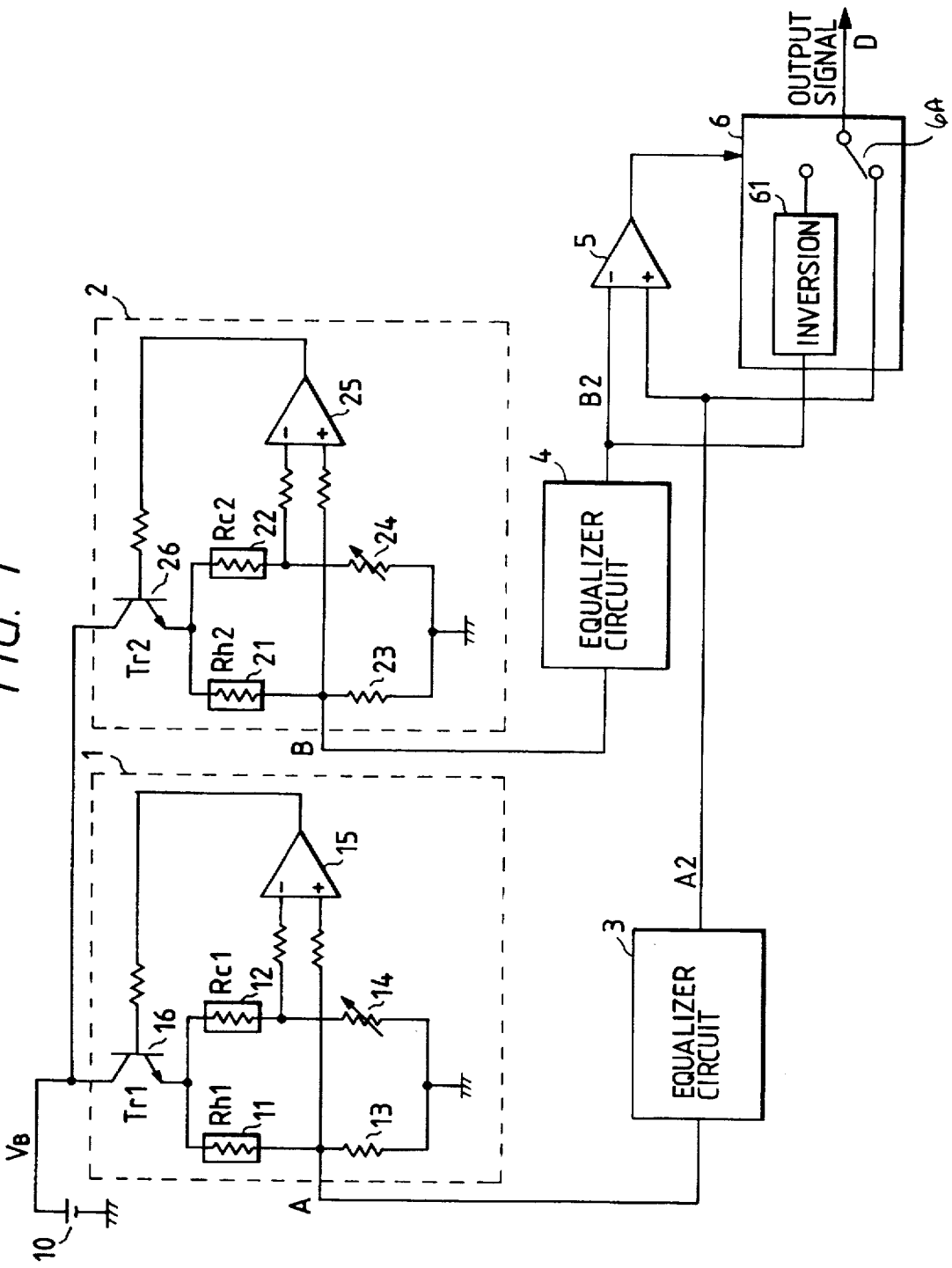
FIG. 1 shows a hot wire driving circuit using equalizer circuits according to one embodiment of the present invention.

In an embodiment of the present invention as shown in FIG. 1, hot wire driving circuits 1 and 2, which are independent of each other, are connected to a power source 10, and generate respective outputs in accordance with air flow amount. The hot wire driving circuit 1 is constructed so that a current which flows into a heating resistor 11 can be adjusted by means of a differential amplifier 15 and a transistor 16, in such a way that the potential difference at a neutral point of the Wheatstone bridge becomes zero. The Wheatstone bridge in this case comprises the heating resistor 11, a temperature compensation resistor 12, and resistors 13 and 14. The resistance value of the heating resistor is controlled so that the temperature may be constant, and a signal corresponding to the air flow rate, obtained from the heating resistor 11, is generated at the electric potential point A of FIG. 1.

In the second hot wire driving circuit 2, as in the case with the heating resistor 11, a signal corresponding to the air flow rate, obtained from the heating resistor 21, is generated at the electric potential point B of FIG. 1.

The heating resistors 11 and 21 are made by winding a white gold or tungsten hot wire as a heater on the surface of a cylindrical or tubular bobbin made of insulating material which has good thermal conductivity, such as ceramic. Glass or ceramics are then applied as a coating material. The heating resistors 11 and 21 may be also made by forming a thin or thick film of white gold or tungsten on the substrate of plate-like glass or ceramic as coating material.

The heating resistors 11 and 21 are arranged within the intake air passage of an internal combustion engine, in close parallel proximity with each other, the heating resistor 11 being located upstream in the forward direction of the intake air flow, and the heating resistor 21 downstream. As in the case of normal hot wire flow rate meters of the constant temperature type, the heating resistors 11 and 21 are heated electrically by the hot wire driving circuits 1 and 2, respectively, so that the differences in temperature between the air flow and the heating resistors 11, 12 become constant independently of the air flow rate.

Because the heating resistor 11 is located upstream in the intake air flow, it is cooled by the forward air flow to a greater extent than the heating resistor 21. Accordingly, the current supplied from the hot wire driving circuit 1 to the heating resistor 11 is greater than the current which flows to heating resistor 21. On the other hand, because a flow in the reverse direction cools the heating resistor 21 to a greater extent than the heating resistor 11, the current supplied from the hot wire driving circuit 1 the heating resistor 21 is greater than that which flows to the heating resistor 11. Therefore, the direction of the air flow can be detected by using the difference in the magnitude of the respective currents. However, the response of the hot wire driving circuit 1 and 2 is delayed due to thermal response characteristics of the heating resistors 11 and 12. As a result, the detection of the direction of the air flow becomes slow, and when pulsation of the air flow occurs in the intake air passage, an error occurs in the detection of the average flow amount.

In the present invention, the frequency response characteristics of the heating resistors 11 and 12, corresponding to the respective air flow amounts, are improved electrically by using equalizer circuits 3 and 4. Further, the difference in the magnitude of the outputs of the equalizer circuits 3 and 4 is detected by a voltage comparator 5, from which the direction of the air flow is detected. In addition, an air flow signal with smaller errors can be achieved by means of a switch circuit 6, which switches between the outputs of the equalizer circuits 3 and 4, and causes the output signal of the equalizer circuit 4 on the reverse flow side to pass through an inverting circuit 61. In this case, it is possible to form an interface with an engine control unit by using only the output signal (without outputting a direction signal). An analog switch made by CMOS technology, another analog switch using the transistors made by a bipolar process and the like can be used as the switch circuit.

Figure 2:
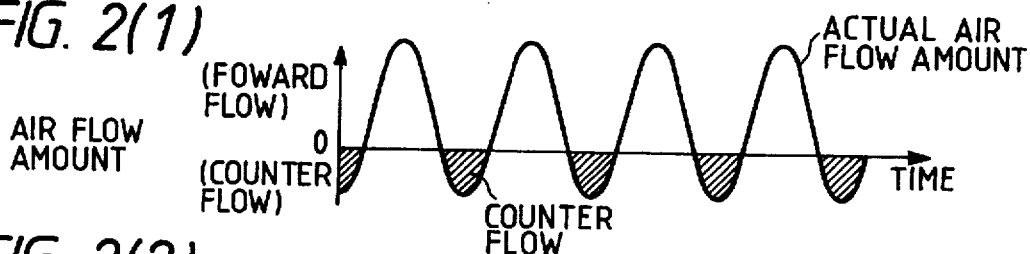
FIGS. 2(1)-2(7) show waveforms of pulsating intake air flows which include reverse flows.
Figure 2:
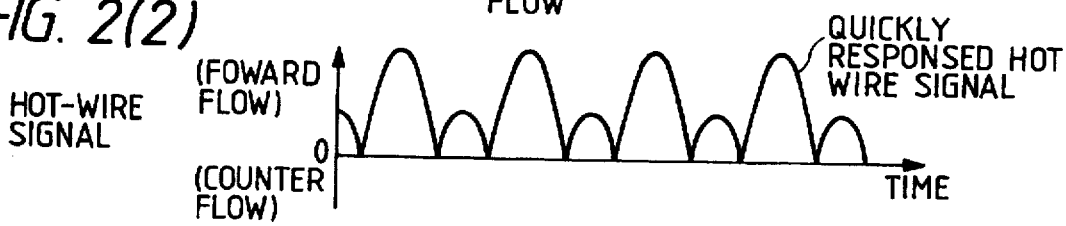
Figure 2:
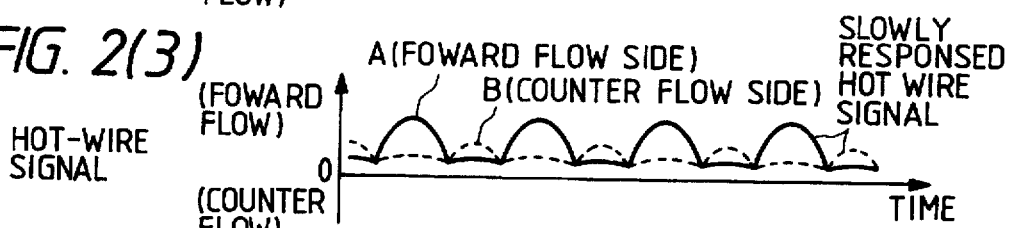
Figure 2:
Figure 2:
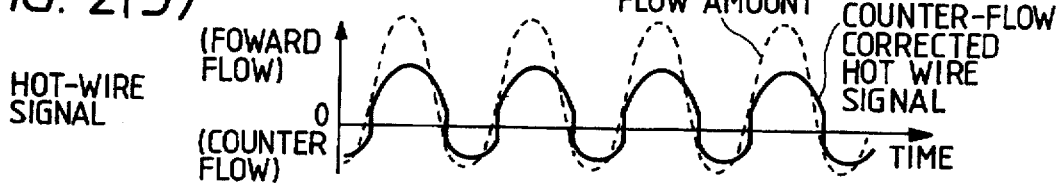
Figure 2:
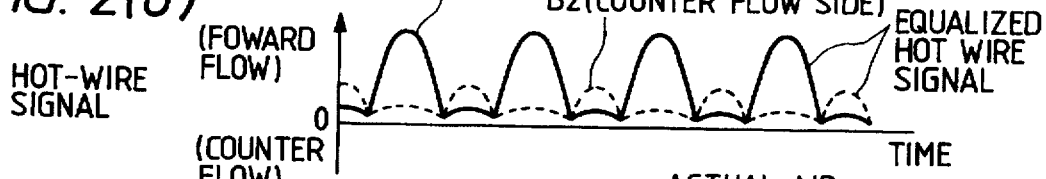
Figure 2:
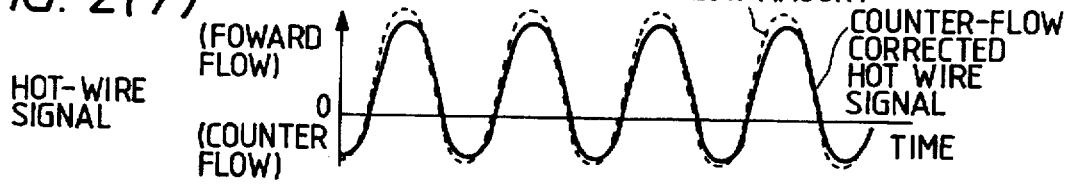

Referring now to FIG. 2, an apparatus using the equalizer circuits 3 and 4 will be explained in detail. In FIG. 2, a hot wire signal is converted into an air flow amount and displayed. When an engine with fewer than four cylinders operates at low engine speed and under heavy load, the amplitude of pulsations in the intake air amount is large, and a negative ("reverse") air flow occurs. Therefore, the air flow is generally similar to a sinewave, as shown in FIG. 2(1). If the engine speed is at 1000 rpm, the pulsating frequency is 33 Hz. (This phenomenon assumes different forms, dependent on the shape of a combustion chamber of the engine, the shape of an intake and exhaust pipes, or the shape of an air cleaner.)

If the pulsating flow is measured by means of a special hot wire probe such as is used as a heating resistor in a quick response measuring instrument, a positive signal corresponding to the absolute value of the instantaneous flow rate is output regardless of the direction of the flow as showing in FIG. 2(2). Because it has good response to the air flow, the output signal of the hot wire detector approaches zero at the transition between the forward flow and the reverse flow. It is possible to obtain the hot wire signal nearest to the actual air flow amount, by using two such special hot wire probes, detecting the direction of flow, and combining the respective output waveforms. However, such a special hot wire probe is very expensive, and also from a view point of reliability, it is difficult to use steadily in machines susceptible to large vibration such as automobile engines.

Accordingly, two conventional highly reliable hot wire probes (which lack a quick response) are connected in parallel and used as the heating resistors 11 and 21. In this arrangement, a positive signal corresponding to the absolute value of the flow rate is output regardless of the direction of the forward flow and the counter flow as shown in FIG. 2(3). Due to the slow response of the detectors in this case, the hot wire signal does not reach zero at the transition point between forward and reverse flow. Further, an output A of the heating resistor 21 disposed upstream in the intake air path has a large value during the forward flow, but a small value during the counter flow. On the contrary, an output B of the heating resistor 21 disposed downstream in the intake air path has a large value during the counter flow, but a small value during the forward flow.

The results of a comparison of these two signals by the voltage comparator 5 (FIG. 1) is shown in FIG. 2(4), in which a high electric potential level (Hi) indicates a forward flow and a low electric potential level (Low) indicates reverse flow. As can been seen in FIG. 2(5), a composite waveform can be constructed by inverting the reverse flow waveform shown in FIG. 2(3) and combining it with the forward flow waveform, also shown in FIG. 2(3). This combination is performed by the switching circuit 6 of FIG. 1, in which the switch 6A is controlled by the direction signal of FIG. 2(4) output by the comparator 5. As can be seen from FIG. 2(5), however, the composite output signal thus achieved is out of phase with the actual air flow amount and its waveform jumps in the neighborhood of zero. Therefore, as compared with the actual average air flow, the combined signal achieved by using only direction signal has an error.

In the embodiment of FIG. 1, the hot wire output signals with the response delay shown in FIG. 2(3) are supplied to the equalizer circuits 3 and 4, in which the response delay is corrected electrically, the result being shown in FIG. 2(6). A hot wire output signal A2 from the forward flow side and an output signal B2 from the reverse flow side have been adjusted by the equalizer circuits 3 and 4 so that their phases and amplitudes follow closely those of the actual air flow amount. A new direction signal (not shown) can be generated in the manner described above, using these signals A2 and B2. A reverse flow corrected hot wire signal having a waveform that is close to the actual air flow as shown in FIG. 2(7) can be obtained by switching the outputs by using the new direction signal and combining them, also in the manner described above. Thereby, it is possible to minimize the error of the average air flow amount.

Figure 3:
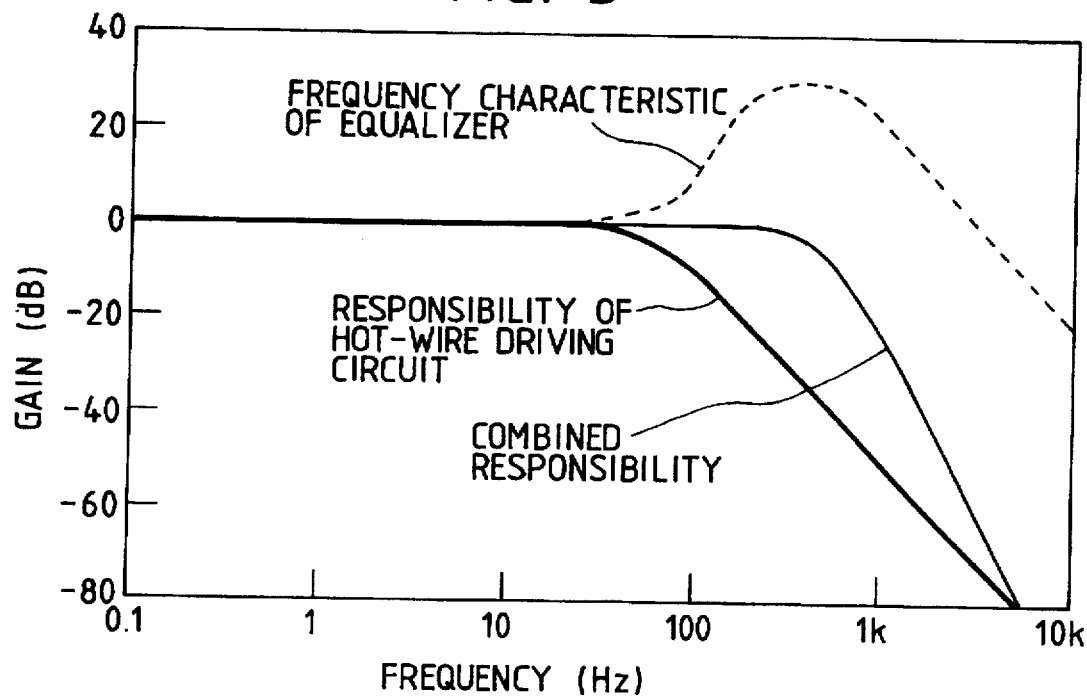
FIG. 3 shows frequency characteristics of the equalizer circuit and a hot wire driving circuit.

FIG. 3 shows an example of frequency response characteristics of the equalizer circuits 3 and 4, together with the frequency response characteristics of the hot wire driving circuit 1 and 2 including the heating resistors 11 and 21 under a constant flow rate. As can be seen in this Figure, the cut off frequency of the hot wire driving circuit is in the range of several tens of Hz, and is significantly less than 100 Hz. (Note that the abscissa in FIG. 3 is logarithmic.) When the engine speed is within the range of 1000 rmp to 2000 rpm, the pulsation frequency of the air flow amount is within the range of 33 Hz to 66 Hz. Therefore, the cut off frequency has an effect, and the detected response is delayed. However, by adding the characteristic of the equalizer having a phase-lead factor as shown in FIG. 3, the composite response is extended up to several hundreds of Hz. This response can be faster by an order of magnitude compared with that of the hot wire driving circuit above. It is desirable that the gain characteristic of the composite response be flat and extend to the largest frequency which occurs. Thereby, it is possible to diminish the direction delay in the measured air flow.

Figure 4:
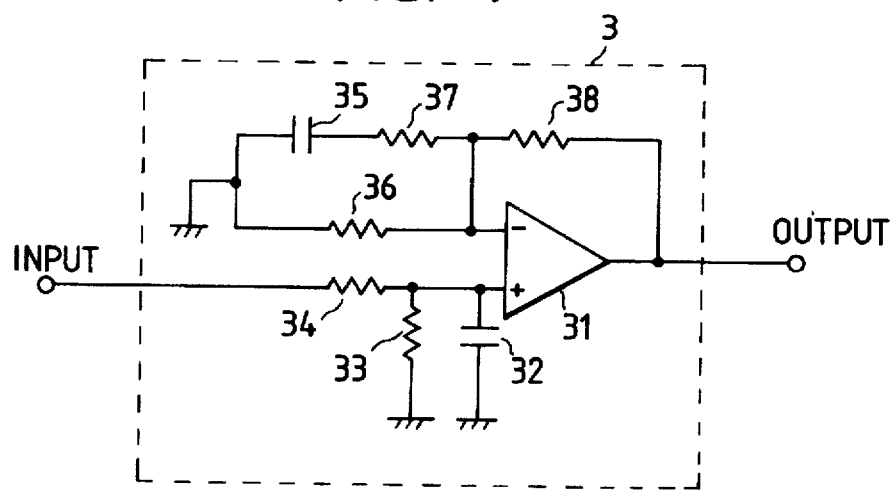
FIG. 4 shows one embodiment of an equalizer circuit.

FIG. 4 shows an embodiment of an electric circuit suitable for use as the equalizer circuits 3 and 4 according to the present invention. In this circuit there is provided a differential amplifier having an input/output gain set by resistors 33, 34, 36 and 38. The characteristic of the phase-lead factor for this circuit is determined by a resistor 37 and capacitors 32, 35.

The above-mentioned embodiment using the equalizer circuit makes it possible to improve easily the response of the air flow detector, as well as the accuracy of measurement of the average air flow amount, without using a special hot wire probe as a heating resistor. Further, since the response of the hot wire driving circuit can be improved by means of an electric circuit, it is also possible to hasten the rising-up characteristic just after a power source is started up.

Figure 5:
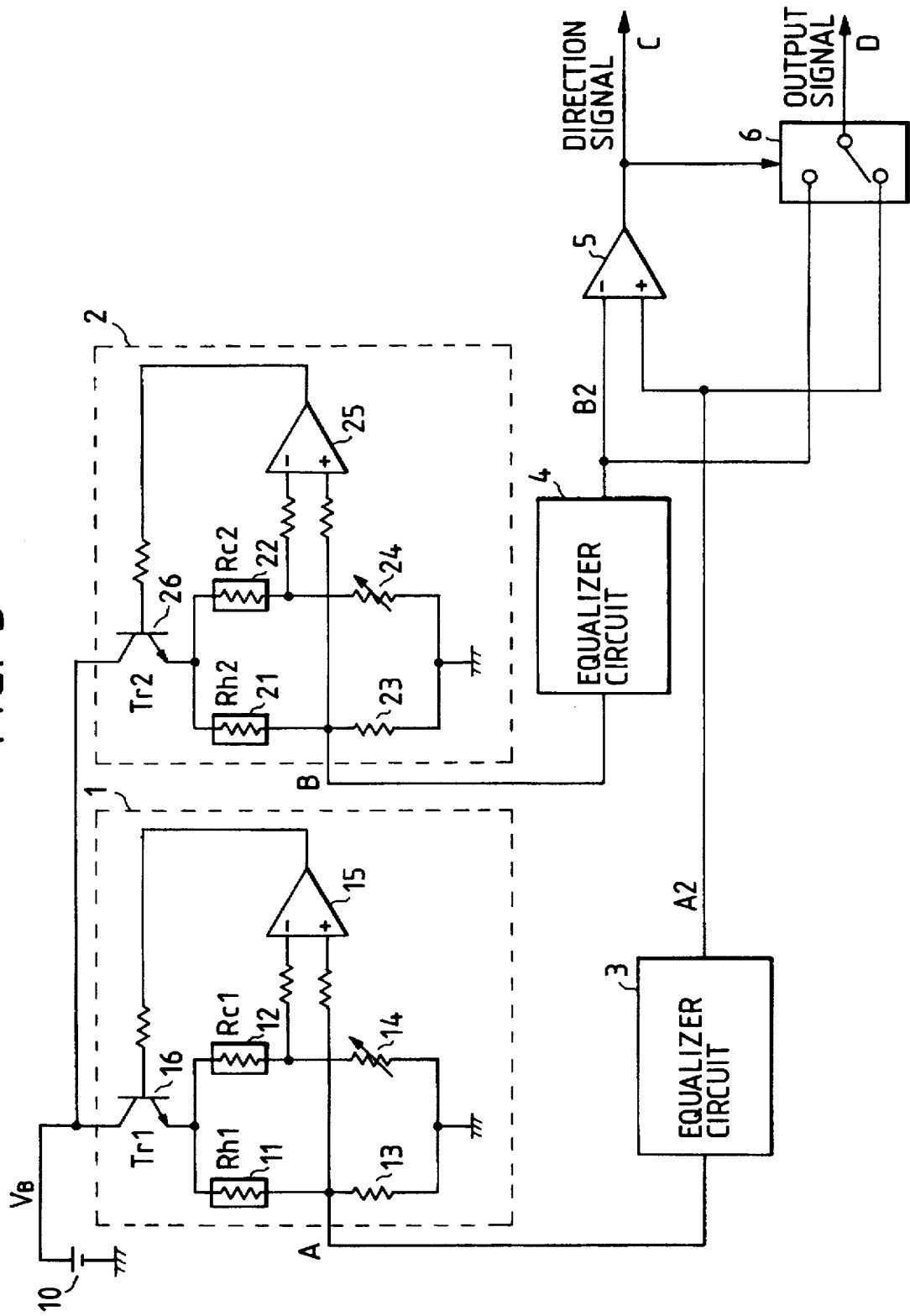
FIG. 5 shows a how wire driving circuit using an equalizer circuit.

A second embodiment of the invention is shown in FIG. 5. In this embodiment, the inverting circuit of FIG. 1 is eliminated, and an engine control unit determines the amount and direction of the flow, using the output signal and the direction signal. It is, therefore, possible to measure the actual flow, taking the counter flow into consideration. Because this present embodiment permits the dynamic range of the forward flow and the counter flow in the output signal to be large, the accuracy of the detection is improved due to an A/D converter of the engine control unit (not shown).

Figure 6:
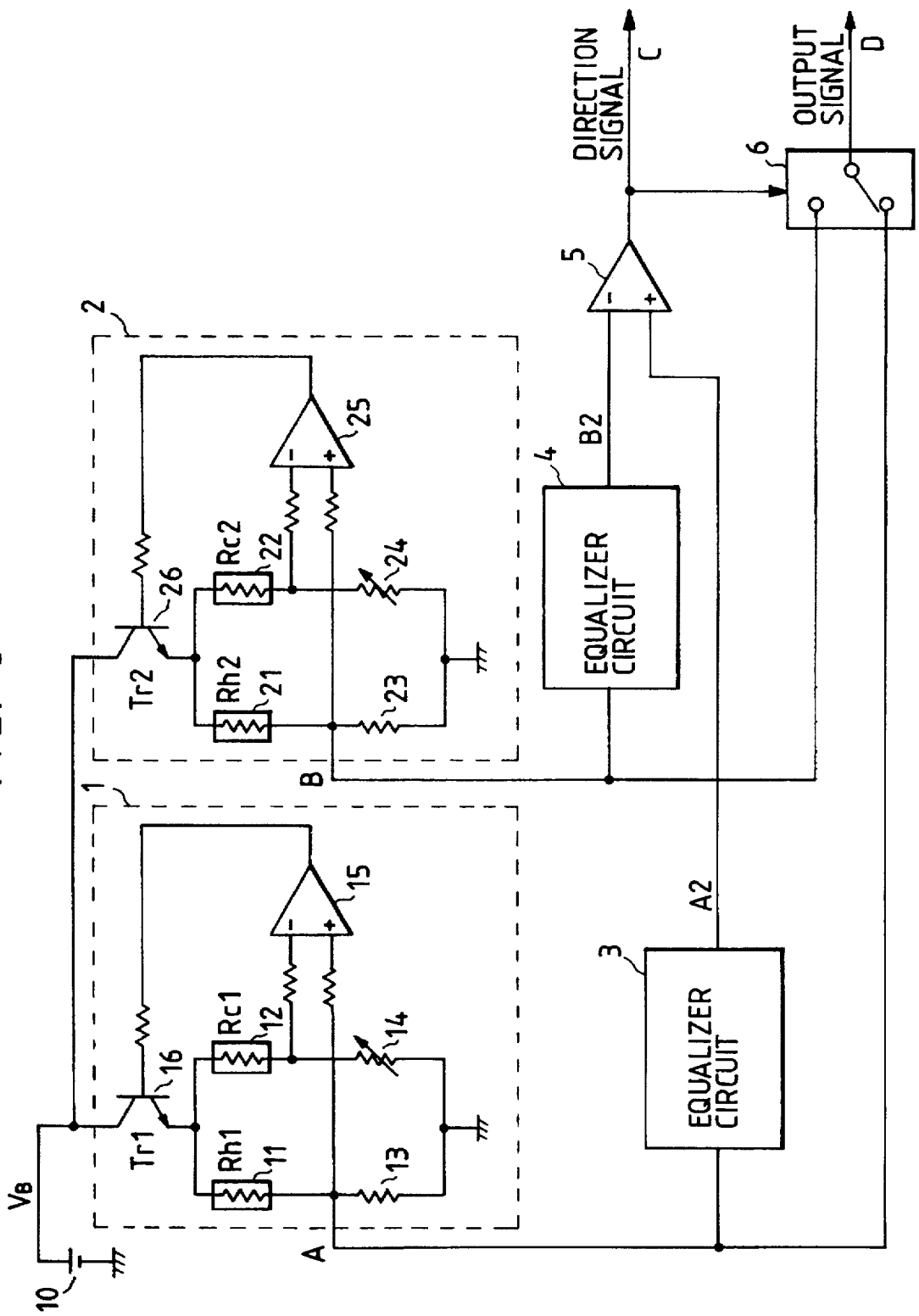
FIG. 6 shows another hot wire driving circuit using equalizer circuits.

A third embodiment of the present invention is shown in FIG. 6. When a reverse flow occurs, even though the amplitude of the pulsating of the intake air is relatively small, according to the shape of the combustion chamber of an engine, the shape of the intake/exhaust pipes, or the shape of the air cleaner, the error due to the delayed detection of the direction signals of the forward and reverse flow caused by slowing of the response is more serious than the error of the amplitude. Thus, in the embodiment of FIG. 6, the outputs of the hot wire driving circuits 1 and 2 are connected to the equalizer circuits 3 and 4, respectively. The outputs of the equalizer circuits 3 and 4 are connected to inputs of a voltage comparator 5, which generates the direction signal. The reverse flow corrected output signal, on the other hand, is obtained by switching the uncorrected outputs signals A and B of the hot wire driving circuits 1 and 2 by a switch circuit 6. Since the outputs of the equalizer circuits 3 and 4 are not used as the air flow output signal, even if the amplitude characteristics of the equalizer circuits 3 and 4 are not calibrated strictly, the detection of the air flow amount is not affected directly. Further, if the amplitude characteristic can be ignored, the equalizer circuits 3 and 4 can be comprised entirely of passive circuit components such as resistors and capacitors, and not include active components such as the differential amplifier shown in FIG. 4.

Figure 7:
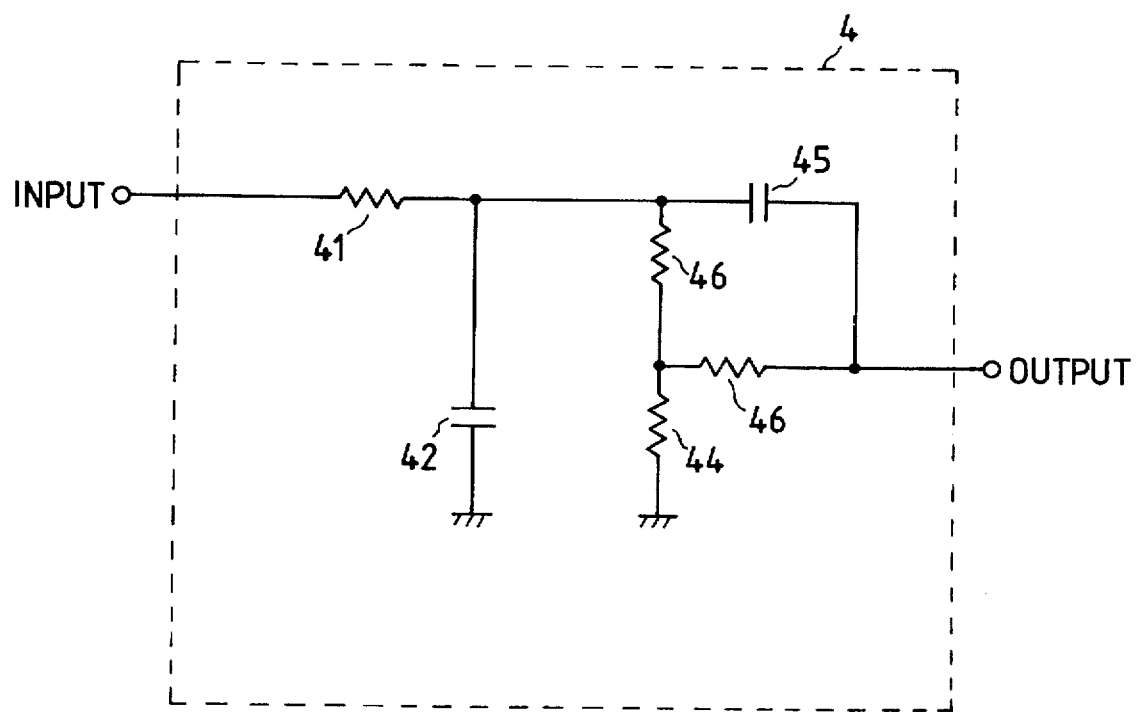
FIG. 7 shows an embodiment of another equalizer circuit.

An example of an equalizer circuit using passive components is shown in FIG. 7. This circuit improves the alternating current amplitude characteristic by connecting a low-pass filter (consisting of resistor 41 and a capacitor 42) to a phase-lead circuit (consisting of resistors 43, 44 and a capacitor 45). According to the present embodiment, although the D.C. gain of this circuit is reduced, it is possible to use it as an equalizer circuit for detecting the flow direction, by changing the A.C. amplitude characteristic.

Because the error caused by the slow response in detection of the direction signals of the forward and reverse flow is further decreased, it is possible to enhance the sensitivity of the direction signal during the reverse flow by designing the equalizer circuits 3 and 4 so that their amplitude characteristic provides a response which is larger than the amplitude of the actual air flow amount, in accordance with the present embodiment. In particular, it is possible to detect the counter flow with high sensitivity, even though the pulsating or the counter flow of the air flow amount is small, and thus it is possible to measure more precisely the air flow amount. It is also easy to set the time constants of the equalizer circuits 3 and 4. In addition, it is possible to reduce the precision of the resistor and capacitor for detecting the time constant, and thus it is not required to adjust extraordinarily.

Figure 8:
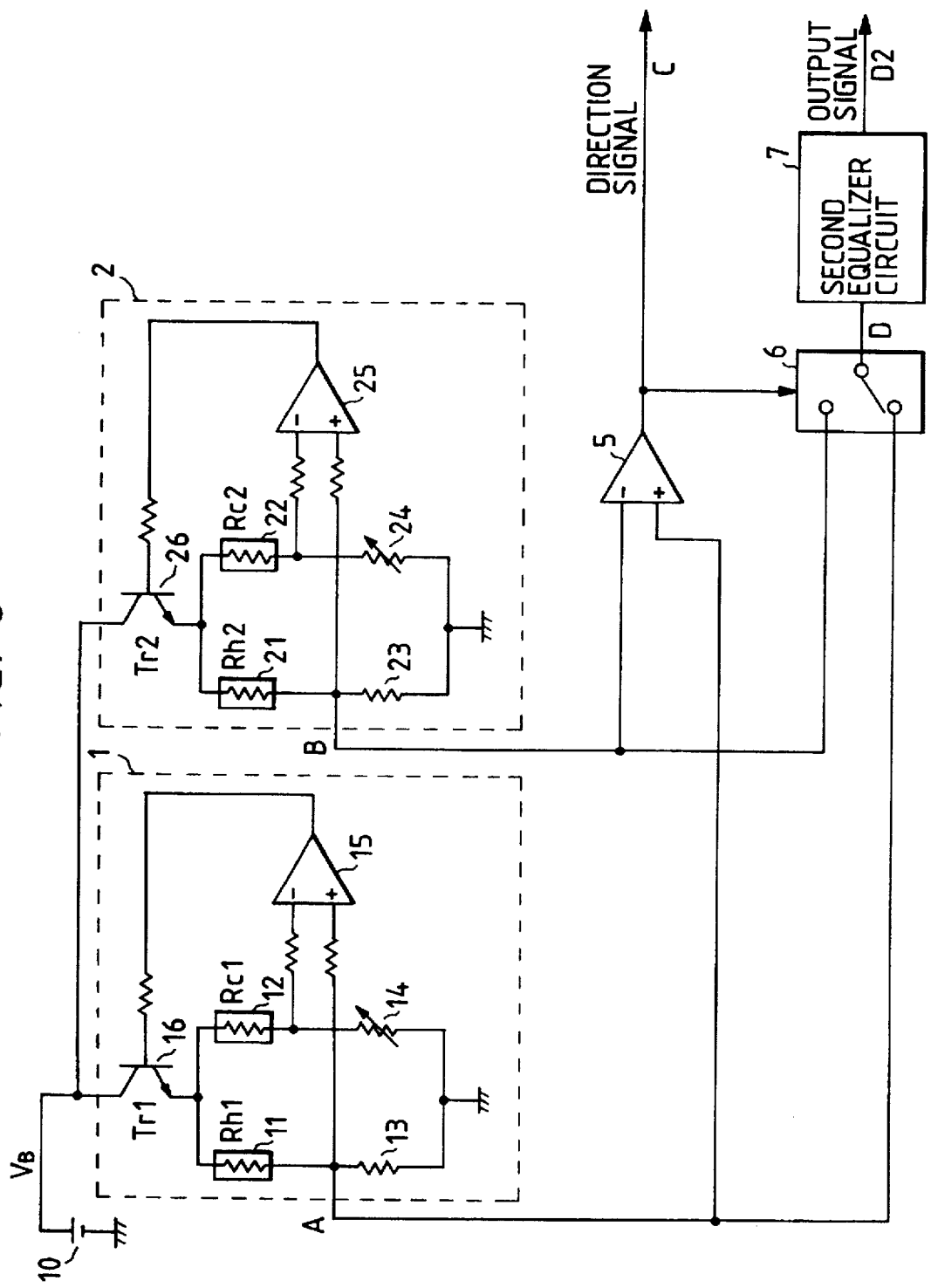
FIG. 8 shows a hot wire driving circuit using the second equalizer circuit, according to another embodiment of the present invention.

A fourth embodiment of the present invention is shown in FIG. 8. When the counter flow is small, but the pulsating amplitude is relatively large, the error in the average value of the intake air flow amount due to the pulsating amplitude is more serious than the error in the air flow amount due to the occurrence of the counter flow. In this embodiment, the direction signal is detected by providing the outputs of the hot wire driving circuits 1 and 2 directly to the voltage comparator 5. After correcting the effect of the counter flow by switching the output signals A, B of the hot wire driving circuits 1, 2 by the switch circuit 6, the air flow amount output signal is produced by correcting the pulsating amplitude through a second equalizer circuit 7. Because the pulsating amplitude is set arbitrarily by using the second equalizer circuit 7 in this embodiment, it is possible to correct the average air flow amount in the positive and negative direction.

Figure 9:
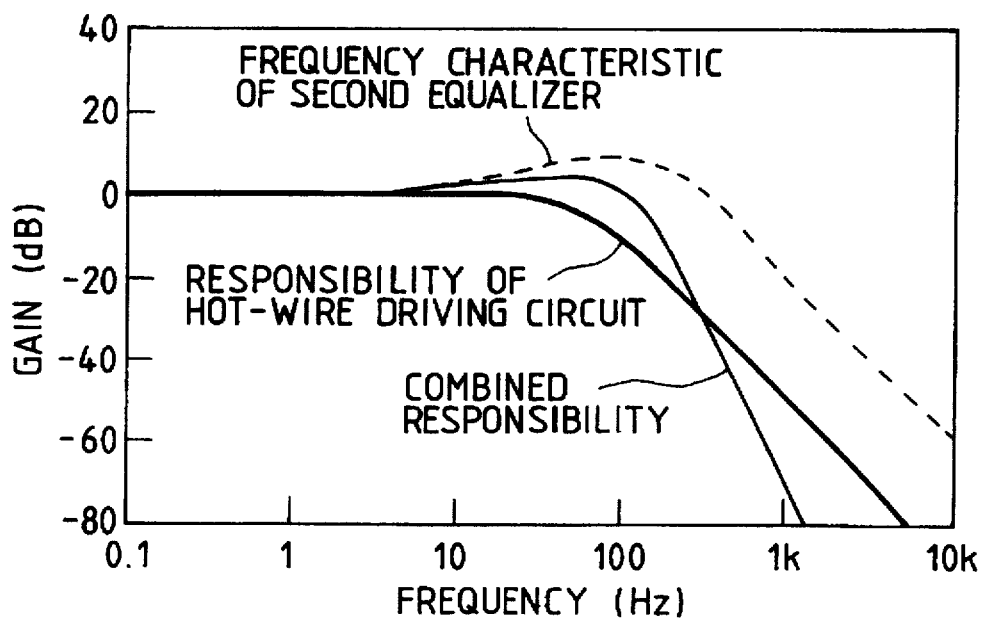
FIG. 9 shows frequency characteristics of the second equalizer circuit and a hot wire driving circuit.

FIG. 9 shows an example of the frequency characteristics of the second equalizer circuit 7, together with the frequency response of the hot wire driving circuits 1 and 2 (including the heating resistors 11 and 21), at a certain constant flow rate. If such a phase-lead factor of the second equalizer circuit as shown in FIG. 9 is added gradually from the time when the response of the hot wire driving circuit is flat, the composite response is increased gradually. Therefore, it is possible to obtain a response in which the cut off frequency is more than 100 Hz. The reduction of the amplitude due to the slow response when the pulsating occurs in the air flow amount, is corrected by changing a gain characteristic. Therefore, it is possible to reduce the error of-measurement of the average air flow amount.

Figure 10:
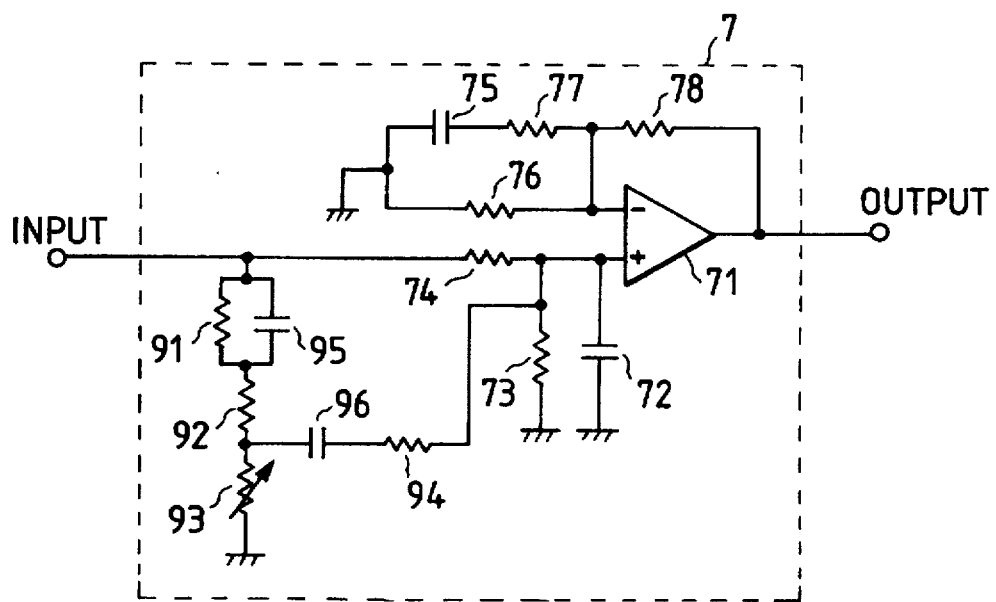
FIG. 10 shows one embodiment of the second equalizer circuit.

FIG. 10 shows an embodiment of the second equalizer circuit 7 which comprises network resistors 91, 92, 93, 94 and capacitors 95, 96 for changing the input/output gain to the equalizer circuit 3 shown in FIG. 4. It is possible to change the gain characteristic of the second equalizer circuit 7 by adjusting the value of a resistor 93. With regard to the fundamental characteristic of the circuit itself, the input/output gain of a differential amplifier 71 is determined by resistors 73, 74, 76, 78, and the phase-lead factor of the frequency characteristic is determined by capacitors 72, 75.

By means of the second equalizer circuit 7, in this embodiment it is possible to provide a monotonically increasing relationship between the throttle opening and the air flow amount by using a simple circuit, thus improving the matching performance to an engine control unit for automobiles.

Figure 11:
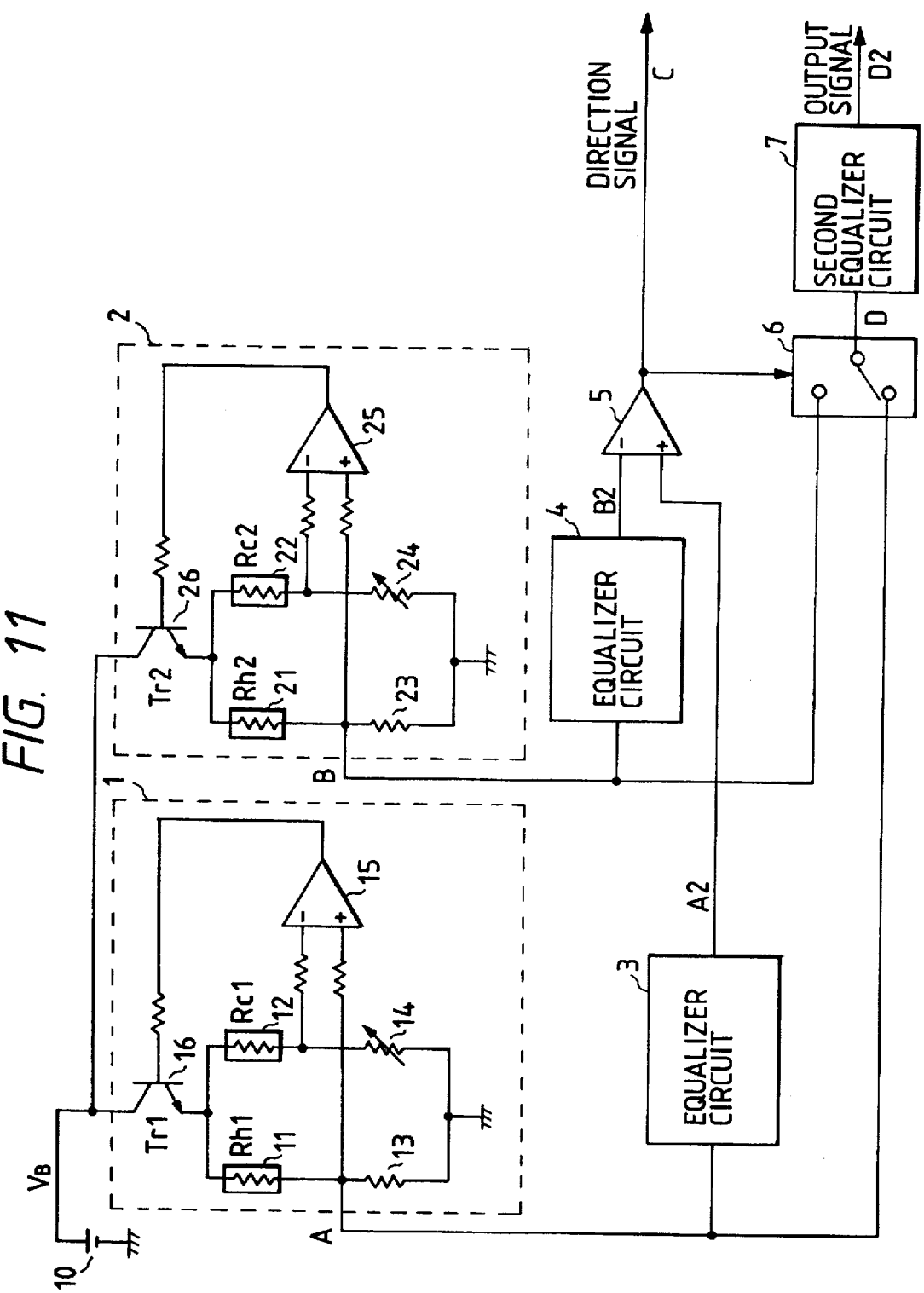
FIG. 11 shows a hot wire driving circuit using the second equalizer circuit.

A fifth embodiment of the present invention as shown in FIG. 11. If both the pulsating amplitude and the counter flow are large, and if the pulsating amplitude includes a plurality of components of high harmonic waves, the error of the detection of the intake air flow quantity due to the slow response of the hot wire driving circuits 1 and 2 may become large in some instances.

In this embodiment, is in FIG. 6, the outputs of the hot wire driving circuits 1 and 2 are input to the voltage comparator 5 through the equalizer circuits 3 and 4, respectively, to generate a direction signal. After correcting the effect of the counter flow by switching the output signals A, B of the hot wire driving circuits 1, 2 by the switch circuit 6, the air flow amount output signal is produced by correcting the pulsating amplitude through a second equalizer circuit 7. Because the delay in the response for the detection of the counter flow is dealt with by the equalizer circuits 3 and 4 in this embodiment, it is possible to enhance the sensitivity of detection and reduce the total detection error by correcting the reduction of the pulsating amplitude due to the slow response by using the second equalizer circuit 7.

According to the present invention, even though the pulsating counter flow is large, it is possible to detect the counter flow with good sensitivity, and thus to measure precisely the air flow amount. Further, because the sensitivity to the pulsating and the counter flow can be set independently of each other, it is easy to adjust in combination with an engine.

Figure 12:
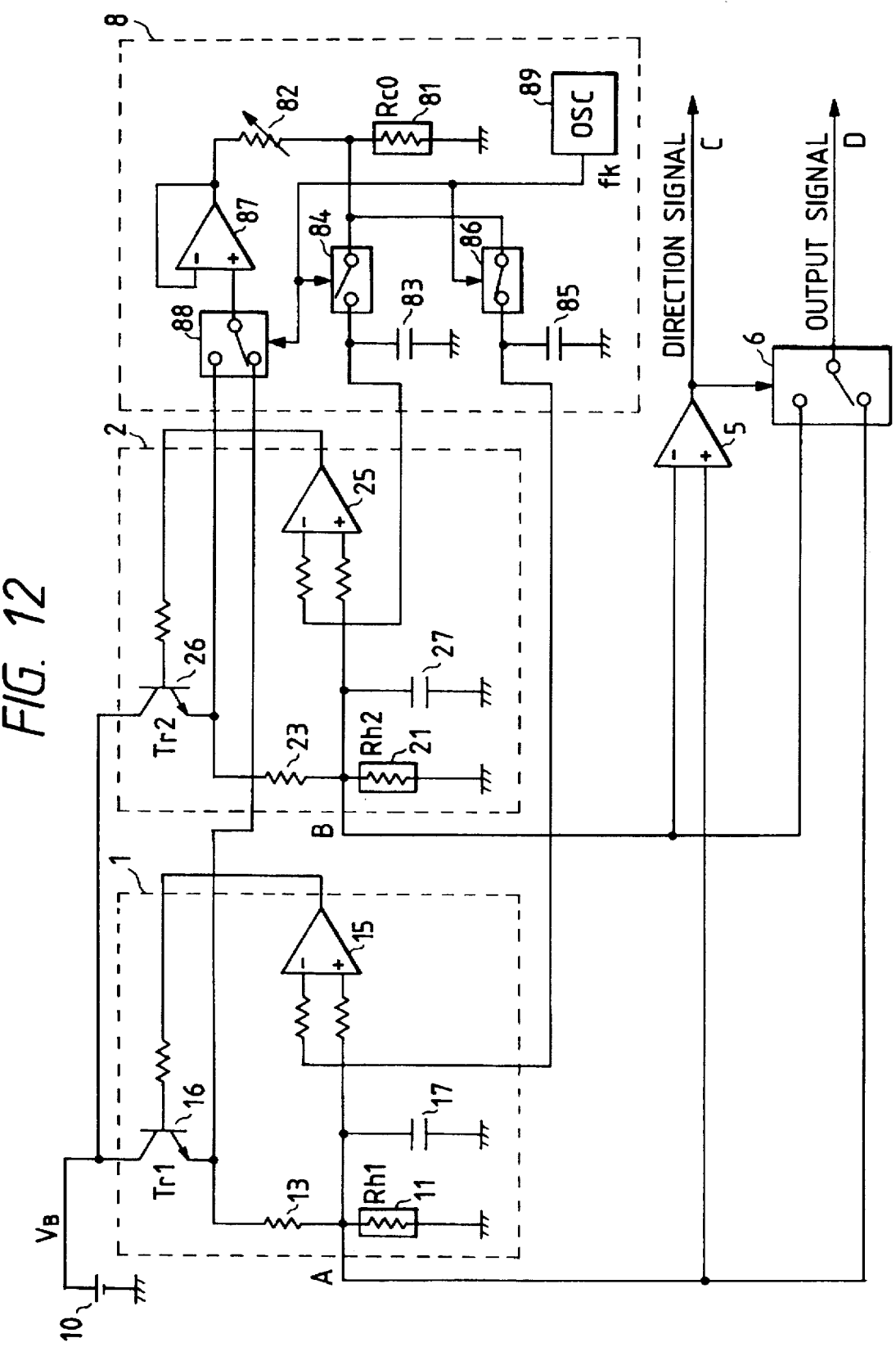
FIG. 12 shows a hot wire driving circuit using a single temperature-compensation resistor.

A sixth embodiment of the present invention is shown in FIG. 12. In this embodiment, the heating resistors 11 and 21 of the bridge circuits in the hot wire driving circuits 1 and 2 are arranged on the ground side, and a separate temperature compensating circuit 8 is provided, so that it is possible to construct the two bridge circuits by using only a single temperature compensating resistor. In the temperature compensating circuit 8, the relationship between a temperature compensating resistor 81, a resistor 82 and the hot wire driving circuit 1, 2 are switched by switch circuits 88, 84, 86 in synchronization with a clock signal from oscillator 8. In order to reduce the variation of voltage caused by switching an electric potential of the emitter side of transistor 16 and 26 in the hot wire driving circuits 1 and 2 by a switch circuit 88, a differential amplifier 87 is used as a buffer. Thus, the current supplied to a resistor 82 connected to the temperature compensating resistor 81 on the ground side is supplied through the buffer circuit or differential amplifier 87. An output of the temperature compensating resistor 81 is input sequentially to the differential amplifiers 15, 25 of the hot wire driving circuit 1, 2, through a sample hold circuit comprising switching circuits 84, 86 and capacitors 83, 85. Therefore, the temperature compensating resistor 81 forms a bridge circuit independently with the respective hot wire driving circuits 1, 2. It is desirable to provide capacitors 17, 27 in parallel with the heating resistors 11, 21 in order to stabilize the operation of the hot wire driving circuit 1 and 2.

In addition, the direction signal is detected by providing the outputs of the hot wire driving circuits 1 and 2 as inputs to the voltage comparator 5. The flow amount output signal is obtained by switching the output signals A and B of the hot wire driving circuit via the switch circuit 6, and correcting the effect of the counter flow. Although in the present embodiment, an equalizer circuit has not been used in the output stage of the hot wire driving circuit, a variety of equalizer circuits may be used in combination with the switching of the direction signals, the flow amount output signals, and so on.

Because this embodiment utilizes only a single (relatively expensive) temperature compensating resistor in the intake air passage along with two heating resistors, it is possible to reduce the manufacturing costs, and to simplify the manufacturing process.

Figure 13:
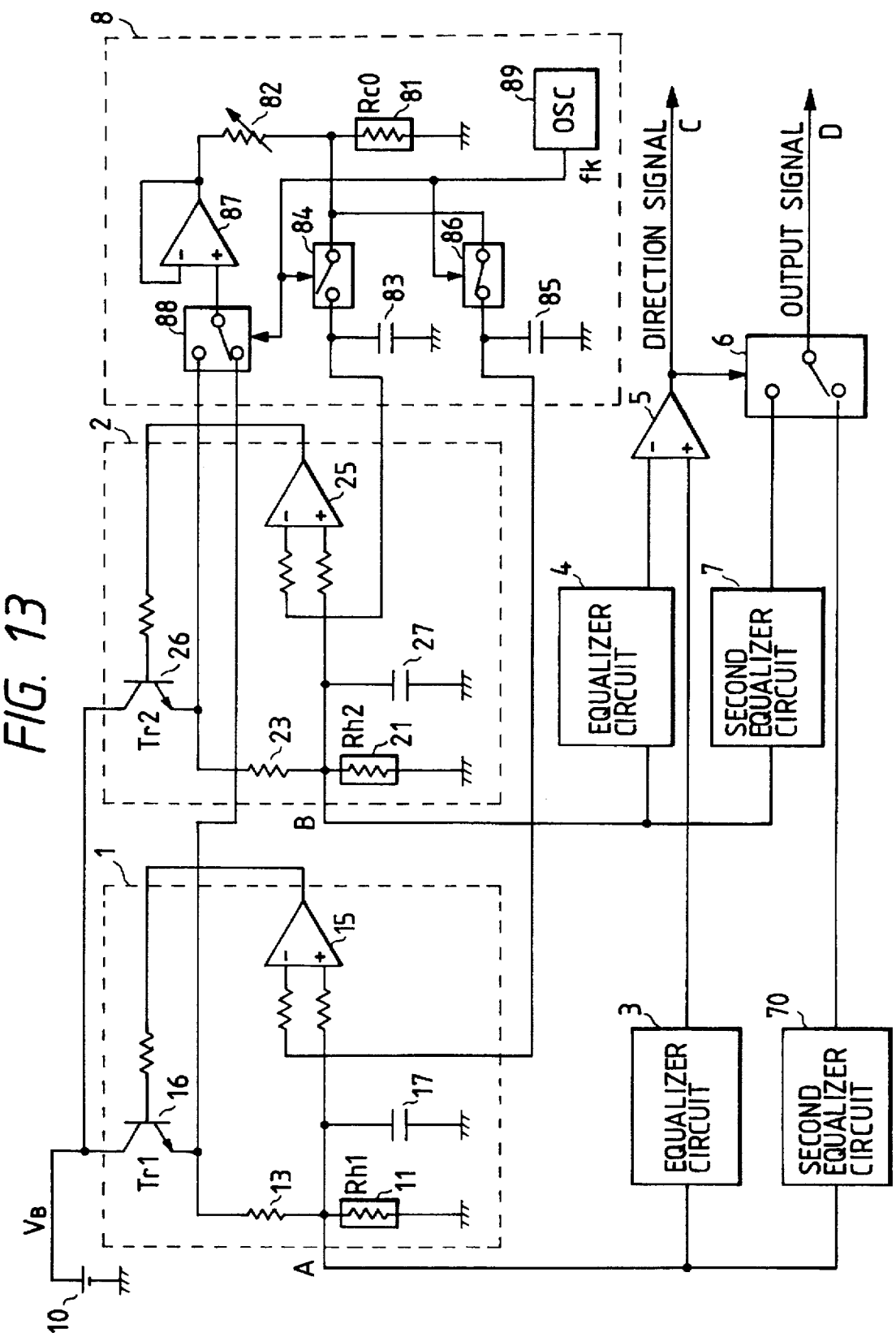
FIG. 13 shows another hot wire driving circuit using a single temperature-compensation resistor.

A seventh embodiment of the present invention is shown in FIG. 13. In this embodiment, the outputs of the hot wire driving circuits 1 and 2 are input to the voltage comparator 5 through the equalizer circuits 3 and 4. The outputs of the hot wire driving circuits are also supplied to the second equalizer circuits 7, 70, in which the delayed response is corrected. The flow amount output signal is obtained by switching the outputs of the second equalizer circuits. This embodiment provide improved accuracy, since the difference of the frequency response between sensors can be adjusted individually.

Figure 14:
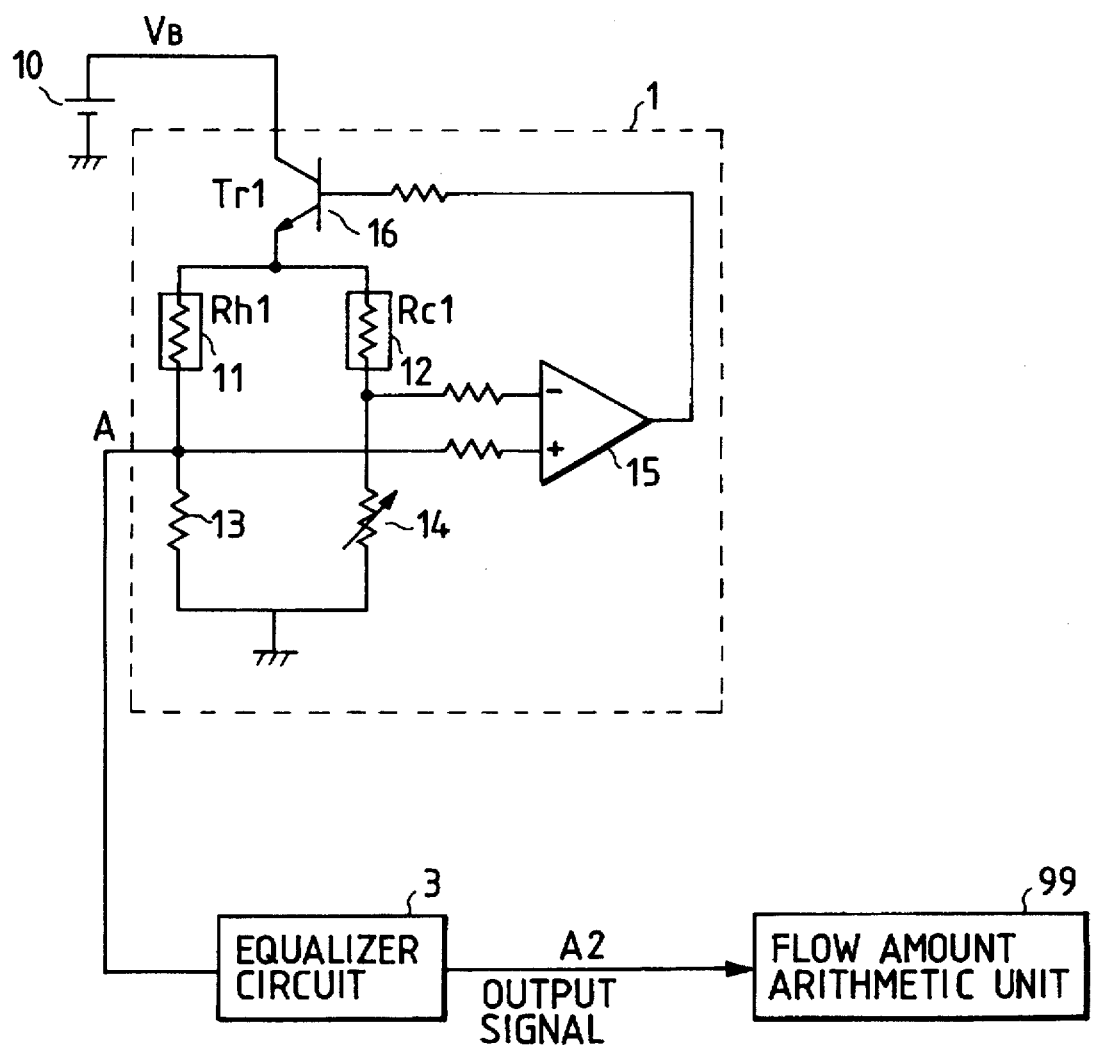
FIG. 14 shows a hot wire driving circuit using an equalizer circuit.

Next, an eighth embodiment of the present invention is shown in FIG. 14. In this embodiment, the delay in the response of the output signal of the hot wire driving circuit 1 is corrected by the equalizer circuit 3, the output of which is supplied to a flow amount arithmetic unit 99. Since the equalizer circuit is provided between the hot wire driving circuit and the flow amount arithmetic unit in this case, it is possible to increase relatively easily the accuracy of the detection of the air flow amount.

Figure 15:
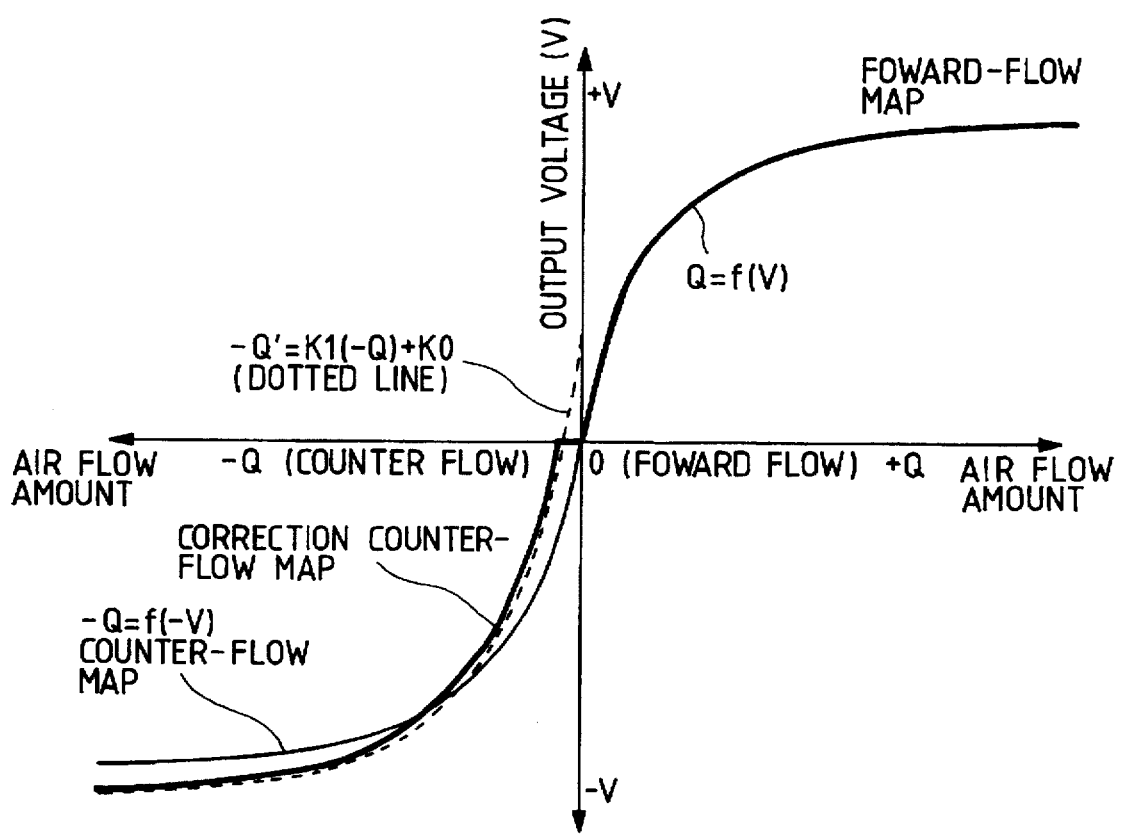
FIG. 15 shows an air flow amount map having a correction counter flow map.
Figure 16:
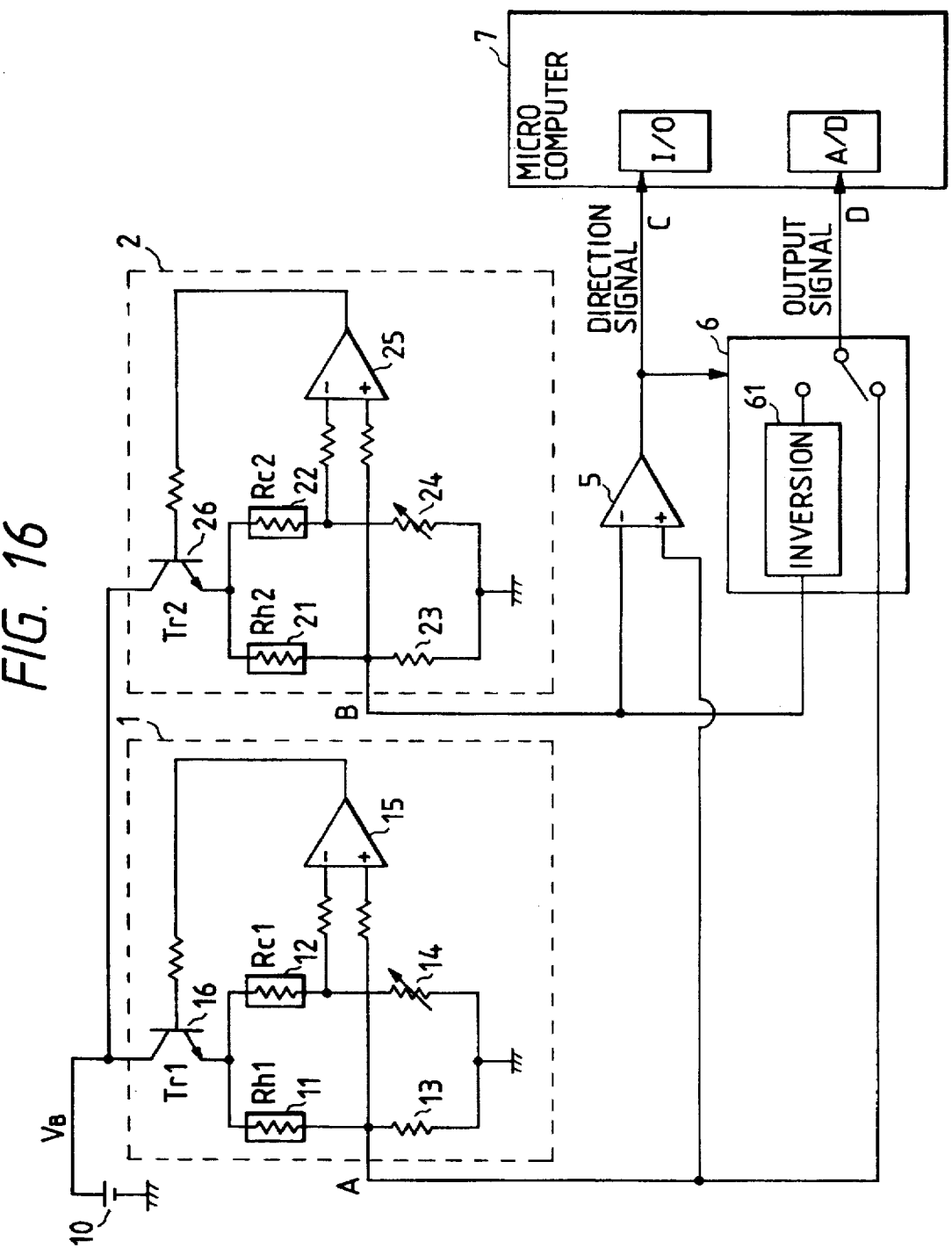
FIG. 16 shows the circuit of a hot wire type air flow amount measuring apparatus.

Still another embodiment of the present invention, in which a correction reverse flow map is provided, is shown in FIGS. 15 to 17. In this embodiment, the flow map is used to convert an output signal from the heating resistor into an air flow amount. In the hot wire type air flow measuring method used according to the present invention, the air flow amount during the reverse flow is measured in a two-step process, using a reverse flow map which has been corrected.

A flow map shown in FIG. 15 is divided into a forward flow side and a reverse flow side. On the right of the map (hereinafter referred to as a forward-flow map) forward flow is represented by a thick line which follows the air flow amount converting function (Q=f(V)) of the forward flow side. On the left, one of the flow maps is a reverse flow map, represented by a thin line which follows the air flow amount converting function (−Q=f(−V)), and the other (represented by a thick line) is a correction reverse flow map obtained by correcting the reverse flow map.

A reverse air flow amount is determined by using the reverse flow map. Further, the reverse flow map is corrected before the air flow amount is corrected. Accordingly, the correction is called a two-step correction. The map obtained by correcting the reverse flow map is referred to as a correction reverse flow map, and an air flow converting function is abbreviated as "a converting function".

In a method of correcting the reverse flow map according to the present invention, the converting function (−Q=f(−V)) of the reverse flow side is corrected by using two parameters, a flow amount gain K1 and of offset K0, which are state determining factors to define a dynamic air flow state. In other words, the correction reverse flow map as shown by a dotted line of FIG. 15 is made by using the following correction function:

$$-Q = K1(-Q) + K0$$

wherein, −Q=f(−V), and V is a signal from the heating resistor (output voltage).

The forward-flow map, and reverse flow map and the correction function or the correction reverse flow map are stored in a ROM (an internal ROM or an external ROM). A microcomputer fetches the map or the correction function from the ROM, uses them in accordance with the direction of the air flow, and converts the signal from the heating resistor into the air flow amount. As seen from the above, the fundamental means for converting the signal from the heating resistor into the air flow amount is the air flow amount converting function. The air flow map is a kind of tool. Accordingly, it is possible to use the tool corrected in advance or correction reverse flow map.

FIG. 16 shows the construction of a circuit in a hot wire type air flow amount measuring apparatus according to the present invention. This apparatus uses the flow map with the correction reverse flow map shown in FIG. 15. With reference to FIG. 16, the operation of the air flow amount measuring apparatus will be explained hereinafter.

In the apparatus shown in FIG. 16, each of the hot wire driving circuits 1 and 2 is an independent circuit connected to the power source 10, and each outputs a signal corresponding to the air flow amount. The hot wire driving circuit 1 regulates the current flowing in the heat resistor 11 by using the differential amplifier 15 and the transistor 16, so that the potential difference at the neutral point of a bridge circuit becomes zero. Thereby, the value of resistance of the heating resistor 11 is controlled to be constant. (In other words, the temperature of the heating resistor 11 is controlled to be constant.) At this time, the signal from the heating resistor 11 corresponding to the air flow is an electric signal obtained a point A of FIG. 16. As in the case of heating resistor 11, a signal from the heating resistor 21 is an electric signal obtained at point B of FIG. 16.

Here, the heating resistors used as a hot wire probe are made by winding a white gold or tungsten hot wire as a heater on the surface of a cylindrical or tubular bobbin made of insulating material which has good thermal conductivity, such as ceramic. Glass or ceramics are then applied as a coating material. The heating resistors may also be made by forming a thin or thick film of white gold or tungsten on the substrate of plate-like glass or ceramic as coating material.

The heating resistors 11 and 21 are arranged within the intake air passage of an internal combustion engine, in close parallel proximity with each other, the heating resistor 11 being located upstream in the intake air flow, and the heating resistor 21 downstream. As in the case of normal hot wire flow rate meters of the constant temperature type, the heating resistors 11 and 21 are heated electrically by the hot wire driving circuits 1 and 2, respectively, so that the differences in temperature between the air flow and the heating resistors 11, 12 become constant independently of the air flow rate.

Because the heating resistor 11 is located upstream in the intake air flow, it is cooled by the air flow when the air flows in the forward direction, to a greater extent than the heating resistor 21. Accordingly, the current supplied from the hot wire driving circuit 1 to the heating resistor 11 is greater than the current heating resistor 21. On the other hand, because an air flow in the reverse direction cools the heating resistor 21 to a greater extent than the heating resistor 11, the current supplied from the hot wire driving circuit 1 to the heating resistor 21 is greater than that which flows to the heating resistor 11. Therefore, the direction of the air flow can be detected by using the difference in the magnitude of the respective currents. However, the response of the hot wire driving circuits 1 and 2 is delayed due to thermal response characteristics of the heating resistors 11 and 12. As a result, the detection of the direction of the air flow becomes slow, and when pulsation of the air flow occurs in the intake air passage, an error occurs in the measurement of the average flow amount.

Referring to FIG. 16, the voltage comparator 5 detects the direction of the air flow by using the difference in magnitude between the signals from the heating resistors 11 and 21, and outputs a direction signal C. The switch circuit 6 switches between the signal from the heating resistor 11 and the signal from the heating resistor 21 (the latter having passed through an inverting circuit 61), according to the above direction signal, and outputs an output signal D to a microcomputer 107 as a forward flow signal or a reverse flow signal. The microcomputer determines the direction of the air flow by using the direction signal C, fetches a plurality of flow amount maps or correction functions stored in a ROM (not shown), and converts the output signal D into the air flow amount. It is also possible to allow the direction signal C and the output signal D to be included in the forward flow signal and the counter flow signal, respectively.

An analog CMOS switch, another analog switch using the transistors made by a bipolar process and the like can be used as the switch circuit 6 used here. Further, it may be possible to use as a plurality of flow maps by correcting only one flow map.

In this embodiment, the output means for outputting the forward flow signal and the counter flow signal is comprised of the hot wire driving circuits 1 and 2, the voltage comparator 5 and the switch circuit 6. The forward-flow map or the air flow amount converting function of the forward flow side, and the reverse flow map or the air flow amount converting function of the reverse flow side, are stored in a ROM (not shown). Further a microcomputer 107 is used as the arithmetic means to perform the calculation based on the air flow amount of the forward flow and the counter flow. Still further, the ROM for storing the correction function of the equation mentioned above and the microcomputer 107 are used as the correction means for correction the air flow amount converting function of the reverse flow side.

It will be understood that the measuring method using the correction function of the reverse flow side corrected in advance by the correction function, is also included within the range of methods in which the air flow amount converting function of the reverse flow side is corrected before the counter flow signal is converted into the counter air flow amount.

Figure 17A:
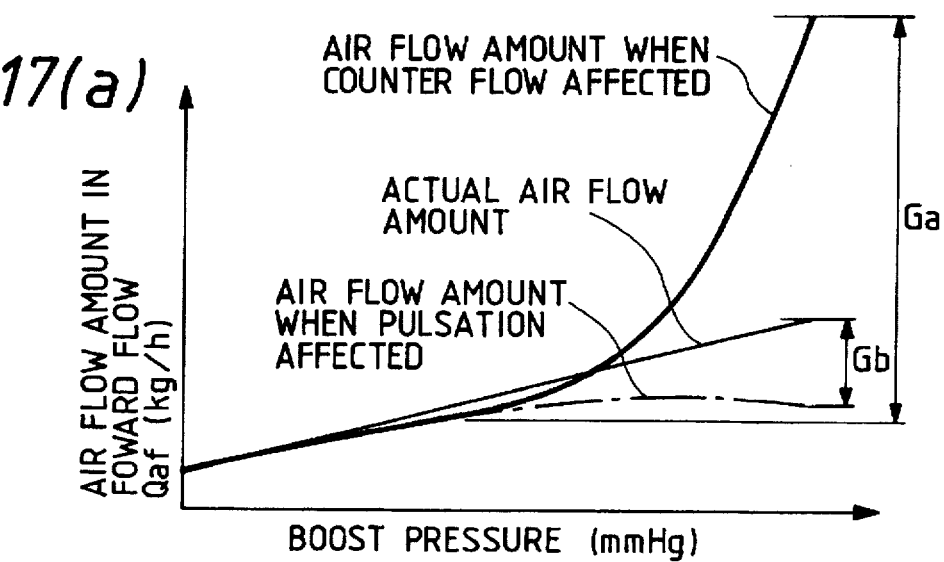
FIGS. 17(a)–17(c) show the effect of an embodiment of the present invention.
Figure 17B:
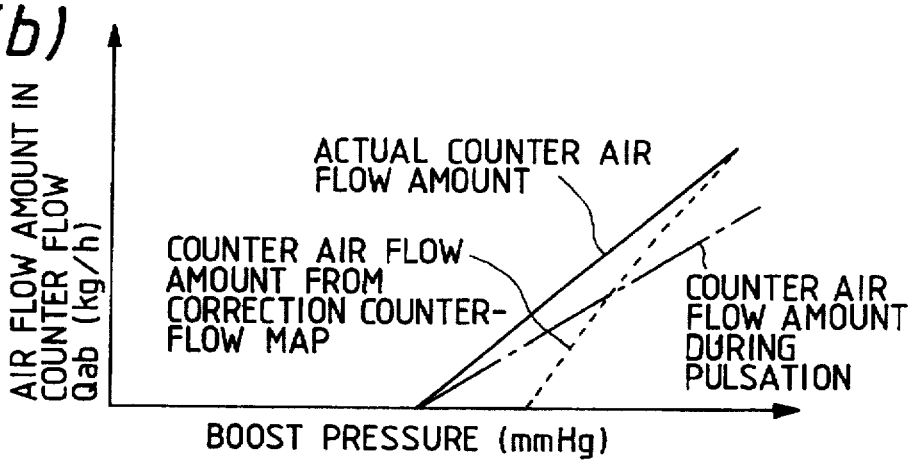
Figure 17C:
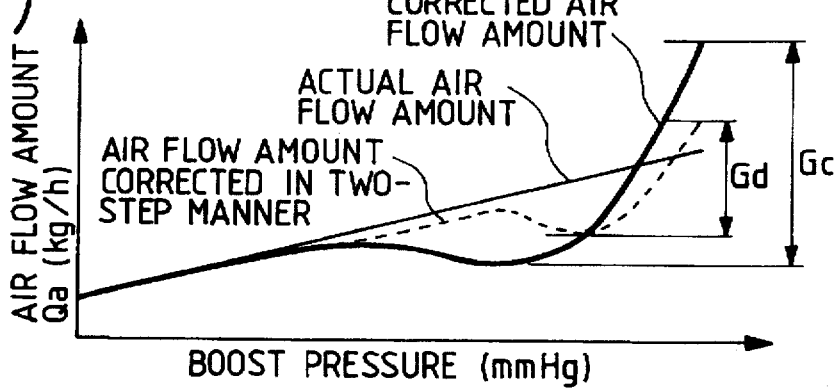

FIGS. 17(a) to 17(c) are graphs which illustrate the relationship between the boost pressure of an engine and the air flow amount, and show the effect of the present invention. The characteristic curve corrected in the two-step manner approaches gradually to the actual characteristic curve with linearity of the air flow amount in order of FIG. 17(a), FIG. 17(b) and FIG. 17(c), so that the peak is reduced and the measurement error is decreased.

FIG. 17(a) shows the air amount Qaf of the forward flow with respect to the boost pressure. Assuming that the engine speed is constant, the intake air amount increases monotonically and linearly as shown by a thin line (the actual air flow amount), as the boost pressure, indicative of the pressure in the intake air pipe, is increased. In electronic fuel injection systems it is important that the measurement error relative to the actual air flow amount be as small as possible. However, if the response of the heating resistor is delayed, a large measurement error is produced by the effect of the pulsating flow or the reverse flow.

One factor in such an error is the pulsating flow as described above. This is the phenomenon that the air flow amount converted by using the flow map is decreased, when the pulsating amplitude of an output signal is reduced due to the delayed in response. The phenomenon is generally called "binary value". The air flow amount with the pulsation affected on it is shown by an alternate long and short dash line in FIG. 17(a); the measurement error Gb is within the maximum 10%. The pulsation with the reverse flow is generally called "jumping-up" in which the air flow amount when the effect of the counter flow is imposed on it is shown by a thick line in FIG. 17(a); the measurement error Ga is within the range of 30% to 100%. It is seen from the difference between the air flow amount including the effect of the reverse flow and the actual air flow, that the measurement error is increased like a hyperbolic curve.

FIG. 17(b) shows the air flow amount Qab of the reverse flow with respect to the boost pressure. If the reverse flow occurs at a predetermined boost pressure, the actual air flow amount of the reverse flow increases monotonically. However, the actually measured air flow amount (alternate long and short dash line) of the reverse flow with the pulsation impressed on it is smaller than the actual air flow amount of the reverse flow (thin line). From this view point, the correction reverse flow map indicative of the characteristic of the reverse air flow amount is induced as shown by a dotted line in FIG. 17(b).

FIG. 17(c) shows the air flow amount Qa to be measured. Even though the measured air flow amount is corrected simply by switching the forward flow and the reverse flow and combining them, an accurate air flow amount cannot be obtained as shown by a thick line in FIG. 17(c). The error is still large. Therefore, it is necessary to correct the air flow amount during the reverse flow by using the correction reverse flow map. As a result, the air flow amount corrected in a two-step manner is obtained as shown by a dotted line in FIG. 17(c). Since the correction is made along the dynamic air flow state, the error (Gd) of measurement can be reduced as shown in FIG. 17(c). The present embodiment illustrates an example of the correction made along the dynamic air flow state in which the correction is made by using two parameters, the flow gain K1 and the offset K0, and $-Q'$ is equal to 0 when $-V$ is equal to or larger than 0.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for measuring intake air for an internal combustion engine, comprising:

an air flow detecting unit including a heat generating resistor;

a flow amount arithmetic unit for calculating an air flow amount based on an output from said detecting unit; and modulating means, coupled between said detecting unit and said flow amount arithmetic unit, for response characteristics of said apparatus by regulating an amplitude of the output signal from said detecting unit.

2. Apparatus according to claim 1, wherein said modulating means is an equalizer circuit.

3. Apparatus according to claim 2, wherein said equalizer circuit comprises:

a differential amplifier having an input/output gain; and a resistor and a capacitor network which determines a phase-lead factor and frequency characteristics of said equalizer circuit.

4. Apparatus according to claim 2, wherein input/output gain and frequency characteristics of said equalizer circuit are determined by a phase-lead circuit comprising a low-pass filter for gain compensation and phase compensation, and a resistor-capacitor network, wherein the output of the low-pass filter is provided as an input to the resistor-capacitor network.

5. Apparatus according to claim 1, wherein said air flow detecting unit is a bridge circuit of a hot wire type air flow meter.

6. Apparatus for measuring intake air for an internal combustion engine, comprising:

first and second air flow detecting units, each including a bridge circuit with a heat generating resistor;

a flow amount arithmetic unit for calculating an air flow amount based on output signals from said first and second detecting units; and first and second modulating means for regulating one of phase and amplitude of said output signals from said first and second detecting unit, respectively, said first and second modulating means being coupled between said respective first and second detecting units and said flow amount arithmetic unit.

7. Apparatus for measuring intake air for an internal combustion engine, comprising:

first and second air flow detecting units, each including a bridge circuit with a heat generating resistor;

a flow amount arithmetic unit for calculating an air flow amount based on output signals from said first and second detecting units; and first and second modulating means comprising first and second equalizer circuits for regulating one of phase and amplitude of said output signals from said first and second detecting unit, respectively, said first and second modulating means being coupled between said respective first and second detecting units and said flow amount arithmetic unit;

means for detecting a direction of air flow based on output signals modulated by the respective equalizer circuits; and switch means for alternately selecting the output of said first and second equalizer circuits, based on the detected direction of said air flow, and for outputting selected signals to said air flow amount arithmetic unit.

8. Apparatus for measuring intake air for an internal combustion engine, comprising:

first and second air flow detecting units, each including a bridge circuit with a heat generating resistor;

a flow amount arithmetic unit for calculating an air flow amount based on output signals from said first and second detecting units;

first and second equalizer circuits for modulating said output signals from said detecting units, respectively, said first and second equalizer circuits being coupled between said respective first and second detecting units and said flow amount arithmetic unit;

means for detecting a direction of air flow based on output signals modulated by the respective equalizer circuits; and switch means for alternately selecting the output signals of said bridge circuits of said first and second detecting units, based on the detected direction of said air flow, and for outputting selected signals to said air flow amount arithmetic unit.

9. Apparatus for measuring intake air for an internal combustion engine, comprising:

first and second air flow detecting units, each including a bridge circuit with a heat generating resistor;

a flow amount arithmetic unit for calculating an air flow amount based on output signals from said first and second detecting units;

first and second equalizer circuits for modulating said output signals from said detecting units, respectively, said first and second equalizer circuits being coupled between said respective first and second detecting units and said flow amount arithmetic unit;

means for detecting a direction of air flow based on an output signal modulated by said first equalizer circuit; and switch means for selecting the output signals of said first and second equalizer circuits on the basis of the detected direction of said air flow, and for outputting selected signals to said air flow amount arithmetic unit.

10. Apparatus for measuring intake air for an internal combustion engine, comprising:

first and second air flow detecting units, each including a bridge circuit with a heat generating resistor;

a flow amount arithmetic unit for calculating an air flow amount based on output signals from said detecting units;

means for detecting a direction of air flow based on respective output signals between said bridge circuits of said first and second detecting units, and said flow amount arithmetic unit;

switch means for alternately selecting output signals of said bridge circuits based on the detected direction of said air flow; and an equalizer circuit for modulating selected output signals.

11. Apparatus for measuring intake air for an internal combustion engine, comprising:

first and second air flow detecting units, each including a bridge circuit with a heat generating resistor;

a flow amount arithmetic unit for calculating an air flow amount based on output signals from said detecting units;

first and second equalizer circuits for modulating said output signals from said detecting units;

means for detecting a direction of air flow based on an output signal modulated by said equalizer circuit, respectively, between one of said first and second detecting units and said flow amount arithmetic unit and between the other of said detecting units and said flow amount arithmetic unit;

switch means for selecting the outputs of said bridge circuits based on the detected direction of said air flow; and an equalizer circuit for modulating the output signal of said bridge circuit selected by said switch means.

* * * * *